DATA HANDLING SYSTEM

INVENTOR.
WYMAN L. DEEG
by
Mason, Kolehmainen,
Rathburn and Wyss
ATTORNEYS.

DATA HANDLING SYSTEM

Filed March 10, 1965 Sheet 2 of 2

INVENTOR
WYMAN L. DEEG
by Mason, Kolehmainen, Rathburn and Wyss
ATTORNEYS

United States Patent Office 3,423,734
Patented Jan. 21, 1969

3,423,734
DATA HANDLING SYSTEM

Wyman L. Deeg, Glenview, Ill., assignor to C. P. Clare & Company, Chicago, Ill., a corporation of Delaware Filed Mar. 10, 1965, Ser. No. 438,570
U.S. Cl. 340—168 13 Claims
Int. Cl. G06f 15/00

ABSTRACT OF THE DISCLOSURE

The application discloses a self-scanning register circuit including a plurality of register stages, each operable on a random basis from a normal reset condition to a set condition. Each stage includes a resetting circuit, and a signal source placed in operation when any stages are set is coupled to the resetting circuits of set stages in sequence so as to reset the set stages in sequence. An output signal is delivered as each stage is reset. The circuit also includes means for preventing the lost of inputs occurring during the sequential resetting.

This invention relates to a data handling system and, more particularly, to such a system including a new and improved self-scanning register circuit.

There are a number of data processing or collecting systems in which input data is provided in the form of electrical signals of widely varying characteristics occurring at random intervals or even coincidentally. These signals can be provided, for instance, by such different means as photocell detectors, mechanically actuated switches, or variable condition monitoring transducers. Because of the varying electrical characteristics of the input signals, it is frequently necessary to provide signal shaping networks between the input data sources and the data receiving means, such as a shift register or a bidirectional counter. Further, in application in which input data from a plurality of different sources is to be supplied to a common receiving means, it is necessary to insure that coincidental input signals are not lost, and that the input signals recur at a rate within the response capabilities of the data receiving means.

Accordingly, one object of the invention is to provide a new and improved data collecting or handling system.

Another object is to provide a register circuit interposed between a data input and a data receiving means for supplying spaced signals of uniform characteristics to the receiving means in accordance with signals of varying characteristics and random timing received from the input means.

Another object is to provide a new and improved self-scanning register circuit for supplying timed output signals of uniform characteristics in response to signals of varying characteristics received at random from input signal sources.

A further object is to provide a self-scanning register circuit using sealed magnetic switches.

A further object is to provide a self-scanning register circuit capable of providing time spaced output signals representing concurrently received input signals.

Another object is to provide a self-scanning register circuit including a plurality of register stages which are individually set in random order at random intervals and which are reset in a timed sequence to control the provision of output signals.

A further object is to provide a self-scanning register circuit including a plurality of register stages each having one or more differential relays selectively operated and released under the control of input signals and resetting signals to supply output signals of known characteristics corresponding to the input signals.

In accordance with these and many other objects, an embodiment of the invention comprises a register circuit comprising a plurality of register stages interposed between a plurality of input data representing signal sources and one or a plurality of data receiving means. Each register stage is individual to an input data source and is operated from a normal reset condition to a set condition in response to the receipt of an input signal which can vary over a wide range of electrical characteristics. The individual register stages can be set at random intervals and in any random order determined by the time of operation of the related input signal source.

To control the provision of output signals, a signal source supplying reset signals to a conductor common to all of the register stages is provided. As each register stage is set, the signal conductor is connected to the set register stage, and its extension to register stages more remote in the resetting sequence is interrupted. The setting of each register stage supplies an enabling or start signal to the signal source so that a signal of a predetermined amplitude and duration is supplied to the signaling conductor. This signal is forwarded over a circuit prepared by the set register stage to an output terminal. It is also applied to the register stage to prepare this stage for operation to its reset condition. At the termination of the reset or drive signal, the previously set register stage is restored to its normal condition, and the signaling conductor is extended to the next adjacent register stage in the resetting sequence which is then in a set condition. The signal source remains in operation until such time as all of the register stages have been returned to the normal reset condition.

Each register stage includes circuit means operative to inhibit the full operation to a set condition of any register stage which is interposed between the signal source and any register stage that is in the process of being returned to its reset condition. This prevents the interruption of a previously initiated resetting operation and avoids distortion of the output signal. This circuit effectively stores an input signal received during this interval and permits the full operation of the related register stage to its set condition at the termination of the existing resetting operation. The output signal delivered by the individual register stages can be supplied in sequence to the input of a single data receiving means, such as a shift register or a counter, or these individual inputs can be individually applied to a plurality of different counting or register circuits.

Many other objects and advantages of the present invention will become apparent from considering the following detailed description in conjunction with the drawings in which.

Figure 1:
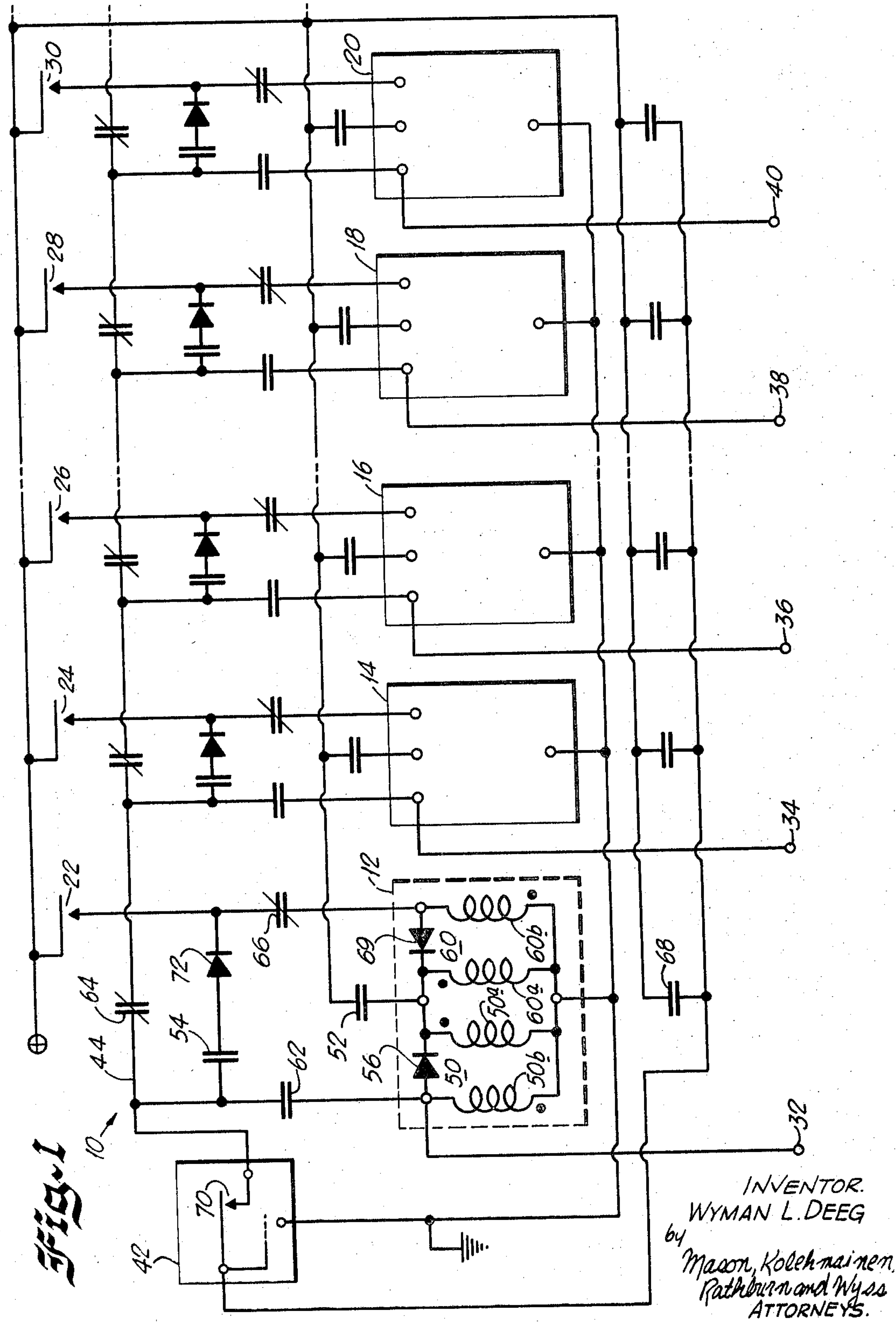
FIG. 1 is a schematic diagram of a data handling system or self-scanning register circuit embodying the present invention.

Referring now more specifically to FIG. 1 of the drawings, therein is illustrated a data collecting system including a self-scanning register circuit 10 comprising a plurality of register stages 12, 14, 16, 18, and 20 which are normally in a reset condition and which are selectively operated to a set condition under the control of a plurality of individually associated input means or pairs of contacts 22, 24, 26, 28, and 30. The plurality of contacts 22, 24, 26, 28, and 30 operate at random intervals in accordance with the conditions to be monitored, such as the presence of an abnormality in a condition to be monitored or the passage of an object past a detecting point. Thus, the regis ter stages 12, 14, 16, 18, and 20 are set at random intervals and in different combinations in accordance with the input information.

To provide means for selectively supplying output signals to a plurality of output terminals 32, 34, 36, 38, and 40 in dependence on the input signals received, the self-scanning register circuit 10 includes a signal or pulse source 42 for supplying reset signals to a signal conductor 44 that is common to the register stages 12, 14, 16, 18, and 20, these register stages being sequentially arranged with respect to the conductor 44. As each one of the register stages 12, 14, 16, 18, and 20 is placed in a set condition, this stage is coupled to the conductor 44, and the extension of this conductor to subsequent register stages in the sequence or series is interrupted. Thus, when the signal source 42 is automatically placed in operation by placing any one of the register stages in a set condition, this source delivers a reset signal which is applied to the first register stage in the sequence that is in a set condition. This signal is concurrently applied to the related output terminal. At the end of the reset signal supplied to the terminal, the output signal is terminated, and the related register stage is returned to its normal reset condition. At this time, the signaling conductor 44 is extended to the input path individual to the next one of the register stages in a set condition. This operation continues until such time as an output signal of controlled electrical characteristics is supplied for each input signal received and until all of the set register stages have been returned to a reset condition. Means are also provided in each of the register stages 12, 14, 16, 18, and 20 for preventing the loss of any input signals received during the resetting operation in which an output signal is delivered.

Accordingly, the self-scanning register circuit 10 provides means automatically placed in operation in response to the receipt of a single input signal for supplying an output signal of controlled electrical characteristics independent of the characteristics of the input signal and for providing successive output signals in a positively timed relationship which can be adjusted to be within the response characteristics of the data receiving means. This circuit is also capable of supplying separate and distinct output signals even when coincident input signals are received by different ones of the register stages.

The individual register stages 12, 14, 16, 18, and 20 can comprise any suitable register stage using controlled conduction devices of various types, such as solid state devices, vacuum tubes, or electromagnetically operated relays. In a preferred embodiment, each of the register stages comprises a bistable circuit or flip-flop of the type shown and described in detail in the copending application of Wyman L. Deeg, Ser. No. 210,119, filed July 16, 1962, now Patent No. 3,244,942, which uses sealed magnetic switches. All of the register stages 12, 14, 16, 18, and 20 are identical to the register stage 12 that is illustrated in detail in FIG. 1 and include a latching relay operated by a differential winding 50 and a control relay operated by a differential winding 60. The differential operating winding 50 for the latching relay includes a pair of coils **50*a* and 50*b* for applying oppositely poled flux fields to two sealed magnetic switches providing two pairs of normally open contacts 52 and 54. The operating winding 60 for the control relay is also differential in nature and includes two coils 60*a* and 60*b* providing oppositely poled flux fields that are applied to the magnetic elements of a group of four sealed magnetic switches providing two pairs of normally open contacts 62 and 68 and two pairs of normally closed contacts 64 and 66. The contacts 64 and 66 can be held in a normally closed condition by permanent magnet bias. The two pairs of coils in each of the windings 50 and 60 are coupled by a pair of diodes 56 and 69**.

The register stages 12, 14, 16, 18, and 20 are normally in a reset condition in which the windings 50 and 60 are not energized. To store an item of input information in one of these register stages, the switch 22, for instance, is closed to complete an energizing circuit for the coil **60*b* extending through the normally closed contacts 66 and to complete an energizing circuit for the coils 50*a* and 60*a* extending through the normally closed contacts 66 and the diode 69. Since the two coils 60*a* and 60*b* of the differential operating winding 60 are both energized, the state of the contacts 62, 64, 66, and 68 is not changed. However, since only the coils 50*a* of the differential winding 50 is energized, the flux applied to the magnetic elements forming the contacts 52 and 54 moves these elements into engagement so that the contacts 52 and 54 are closed. The closure of the contacts 52 completes a holding circuit for energizing the coils 50*a* and 60*a*. The closure of the contacts 54** completes a circuit for preventing an interruption in any resetting operations being performed in subsequent ones of the register stages.

When the input signal is removed, as by opening the contacts 22, the coils **50*a* and 60*a* remain energized over the holding circuit including the closed contacts 52, but the coil 60*b* in the differential winding 60 is no longer energized. Since a flux field of a single polarity is now applied to the magnetic elements forming the contacts 62, 64, 66, and 68 rather than the oppositely poled fluxes provided when both of the coils 60*a* and 60*b* are energized, the contacts 62 and 68 are closed and the contacts 64 and 66 are opened. The opening of the contacts 66 interrupts the above-identified operating or setting circuit for the register stage 12. The closure of the contacts 62 connects the signaling conductor 44 to the register stage 12, and the opening of the contacts 64 interrupts the extension of the signaling conductor 44 to any subsequent stages in the circuit 10. The closure of the contacts 68 connects the potential supply to the pulse generator 42 and initiates operation of this source so that the set register stage 12 is reset and an output signal is delivered to the terminal 32 representing the input signal previously received from the input contacts 22**.

The signal source 42 can be of any suitable construction capable of developing time spaced and positively poled signals for the period in which an enabling potential is supplied to this source or generator. As an example, the signal source or pulse generator 42 can comprise the pulse generator shown in FIG. 2 of the drawings or the one shown and described in detail in the copending application of Wyman L. Deeg, Ser. No. 109,543, filed May 12, 1961. When a positive enabling potential is supplied to the pulse generator 42, a drive means therein operates a switching means to deliver a positive-going pulse to the signal conductor 44. In the pulse generator 42, this switching means is shown schematically as a pair of contacts 70 which are closed to connect the positive potential source to the conductor 44. This potential is forwarded through the closed contacts 62 to be applied to the output terminal 32. This potential also energizes the coil **50*b* and is forwarded through the diode 56 to maintain the energization of the coils 50*a* and 60*a***.

When both of the coils **50*a* and 50*b* are energized, oppositely directed flux fields are applied to the magnetic elements forming the contacts 52 and 54 so that these contacts are released or restored to their normal condition. The opening of the contacts 52 disconnects the source of holding potential from the coils 50*a* and 60*a*, but these coils are maintained energized through the diode 56 and the pulse source 42. At the end of the reset pulse provided by the generator 42, the contacts 70 are opened, and the energization of the output terminal 32 and of the coils 50*a*, 50*b*, and 60*a* is terminated. The termination of the energization of the coils 50*a* and 50*b* does not change the state of the open contacts 52 and 54. However, the termination of the energization of the coil 60*a* removes the flux field applied to the magnetic elements forming the contacts 62, 64, 66, and 68** so that these contacts are restored to their normal condition.

The opening of the contacts 62 disconnects the register stage 12 from the signal conductor 44, and the closure of the contacts 64 extends this conductor to the next one of the register stages 14, 16, 18, and 20 that is in a set condition. The closure of the contacts 66 connects the input circuit for the register stage 12 to the input contacts 22. The opening of the contacts 68 interrupts one path for applying an enabling potential to the signal generator 42.

If none of the register stages 14, 16, 18, and 20 is in a set condition at the time that the register stage 12 is reset, the opening of the contacts 68 disables the signal sourcce 42 and returns this source to an inoperative state. Alternatively, if any other of the register stages 14, 16, 18, or 20 has been set by the related input contacts 24, 26, 28, or 30, respectively, in the interval following the setting of the register stage 12, the pulse generator 42 remains in operation. Assuming that the register stage 16 is set following the setting of the stage 12, the contacts 68 controlled by the stage 16 remain closed, and the pulse generator 42 remains in an operative state to deliver the following positive-going pulse from the closed contacts 70 over the signaling conductor and through the contacts 64 in the register stages 12 and 14 and the closed contacts 62 associated with the set register stage 16 to both provide an output signal at the terminal 36 and control the resetting of the register stage 16. In this manner, the signal source 42 delivers an output signal of controlled duration and amplitude to the output terminals 32, 34, 36, 38, and 40 associated with set ones of the register stages 12, 14, 16, 18, and 20. The circuit 10 resets these stages in a sequence moving from left to right in FIG. 1 with the stage disposed furthest to the left being reset first regardless of the time at which it was set. This operation continues until such time as all of the register stages 12, 14, 16, 18, and 20 have been operated to their normal reset condition. At this time, the operation of the pulse generator 42 is terminated and is not initiated until the next one off the register stages is set representing the receipt of input information.

The arrangement of the self-scanning register circuit 10 is also such that the receipt of an item of input information from the contacts 22, 24, 26, 28, or 30 during the time in which one of the register stages 12, 14, 16, 18, and 20 is being reset does not result in either the loss of the received input data or any distortion or alteration in the uniform output signals supplied to the output terminals 32, 34, 36, 38, and 40. More specifically, when an item of input information is received by a register stage disposed to the right of the register stage being reset, this register stage can be operated to a set condition in the manner described above without affecting the resetting of the register stage disposed to the left in the sequence. As an example, if the register stage 16 is being reset, the stages 18 and 20 can be operated to a set condition without affecting the reset operation. However, if an attempt is made to operate either of the stages 12 or 14, which are disposed to the left of the register stage 16 that is being reset, the operation of, for instance, the register stage 12 would open the normally closed contacts 64 and thus prematurely terminate the application of the reset signal to the register stage 16 and also prematurely interrupt the output signal supplied to the output terminal 36.

This is avoided by the provision in each of the register stages 12, 14, 16, 18, and 20 of a circuit including the normally open contacts 54 and a diode 72. Assuming that the contacts 70 are closed to supply a positive potential to the output terminal 36 and to control the resetting of the register stage 16 and that the contacts 22 are closed during the application of the positive potential to the conductor 44, the closed conacts 22 again energize the coils 50$a$, 60$a$, and 60$b$ in the manner described above so that the contacts 52 and 54 are closed. The contacts 62, 64, 66, and 68 are not operated because of the oppositely poled fluxes applied thereto by the energization of the differential windings 60$a$ and 60$b$. The closure of the contacts 52 again completes a holding circuit for maintaining the energization of the coils 50$a$ and 60$a$. The closure of the contacts 54, however, now connects the signaling conductor 44 through the closed contacts 66 and the diode 72 to maintain the energization of the coil 69$b$. Accordingly, when the input contacts 22 are opened, both of the coils 60$a$ and 60$b$ in the differential winding 60 remain energized, and the control relay in the register stage 12 cannot be operated.

At the termination of the resetting pulse from the signal source 42, the opening of the contacts 70 interrupts the circuit extending through the conacts 54 and the diode 72 for energizing the coil 60$b$, and this coil is no longer energized. The unidirectional flux then developed by the continued energization of the coil 60$a$ causes the operation of the contacts controlled thereby so that the contacts 62 and 68 are closed and the contacts 64 and 66 are opened. Since the register stage 12 is the first register stage in the series connected to the signaling conductor 44, the register stage 12 will be reset on the next cycle of operation of the signal source 42 regardless of the number of register stages disposed to the right of this stage in FIG. 1 which are in a set condition.

The signals supplied at the output terminals 32, 34, 36, 38, and 40 can be utilized in a number of different ways. If, for instance, the input data represented by the selective closure of the contacts 22, 24, 26, 28, and 30 represents the occurrence of the different events which are to be separately counted or totalized, each of the output terminals 32, 34, 36, 38, and 40 can be connected to an individual counter. Alternatively, if the total number of, for instance, occurrences of a given event are to be collected in a single total, a blocking or isolating diode can be connected in series with each of the output terminals, and a common terminal of the diodes can be connected to the input of a single counter or totalizer. It is possible to provide this common connection because output signals cannot occur on more than one of the output terminals at any given time, and these output signals are such as to insure reliable operation of either the individual or common counter because of their uniform electrical characteristics and time spaced relation. Further, any number of coincident input items can be received and stored in the register stages 12, 14, 16, 18, and 20 without causing the loss of the input signal. To insure that no input signals are lost, the repetition rate of the pulse source 42 should be set to be equal to or greater than the product of the maximum repetition rate of the random occurring events represented by the closure of the input contacts and the number of register stages in the circuit 10.

Figures 2, 3:
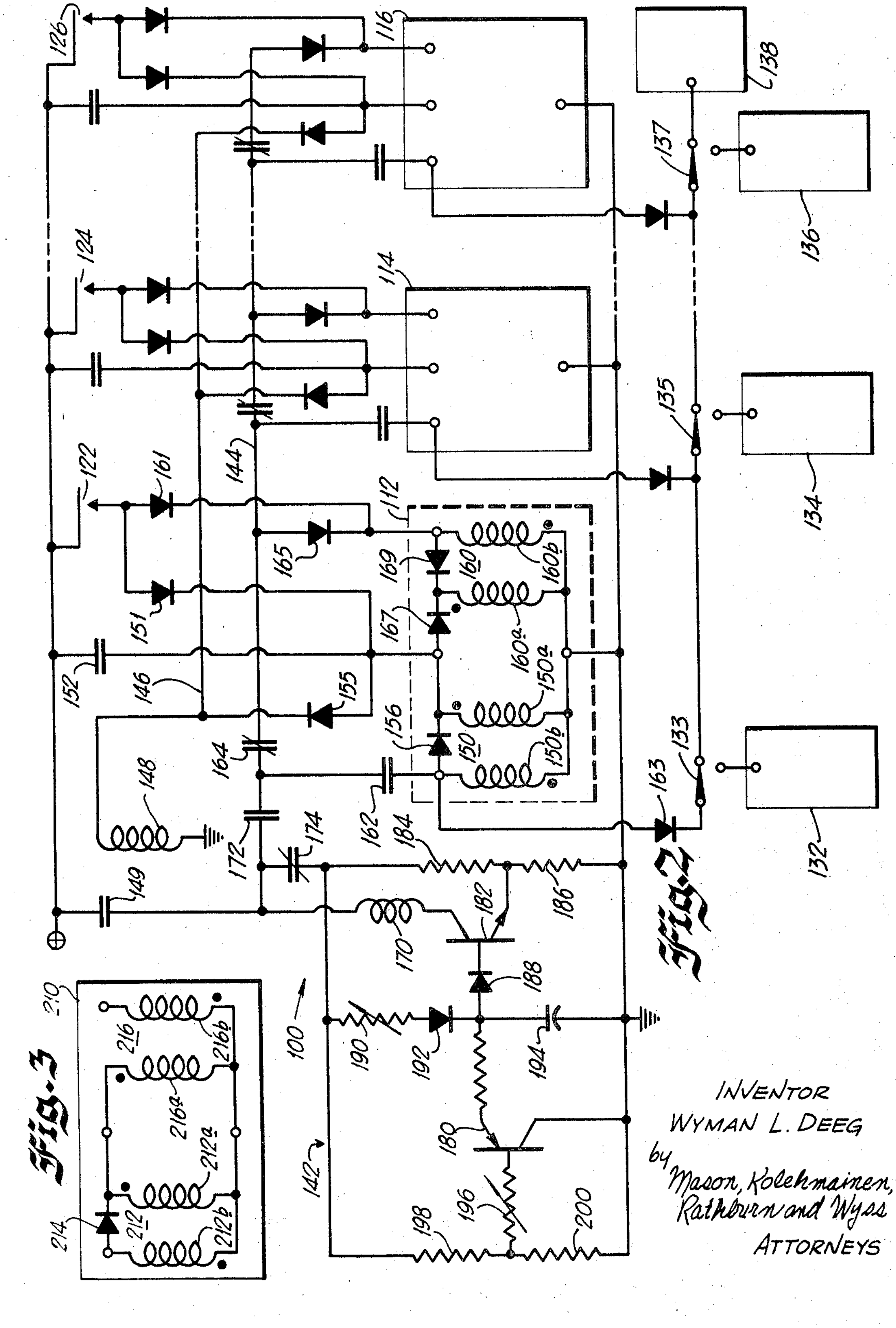
FIG. 2 is a schematic diagram of another embodiment of the system or self-scanning register circuit.
FIG. 3 is a schematic diagram of an individual register stage that can be used in the register circuit shown in FIG. 2.

Referring now more specifically to FIG. 2 of the drawings, therein is illustrated a self-scanning register circuit 100 which is similar to the register circuit 10 but which requires a smaller number of switches in the two switching assemblies or relays in each of the register stages provided therein. The register circuit or data handling system 100 includes a number of individual register stages equal to the number of different inputs and, in FIG. 2, is shown as including three register stages 112, 114, and 116. These register stages are normally in a reset condition and are selectively operated to set conditions at random time intervals under the control of individually associated input means shown as three switches 122, 124, and 126. When set, the register stages 112, 114, and 116 control the selective application of corresponding output signals to either three individually related data receivers 132, 134 and 136 or a common data receiving means 138. The output signals are selectively supplied to the data receiving means 132, 134, 136, and 138 by selectively actuating a plurality of switches 133, 135, and 137 to either the positions shown in which the various outputs are connected in series to the input of the common data receiver 138 or to their alternate positions in which the individual outpu are applied to the individually associated counters 132, 134, and 136.

The output signals are developed by the circuit 100 under the control of the selective setting of the register stages 112, 114, and 116 in substantially the same manner as in the circuit 10 by the selective application of reset signals from a signal source or pulse generator 142 to a reset signal conductor 144. Whenever one of the register stages 112, 114, or 116 is placed in a set condition, an enabling potential is forwarded over a common status conductor 146 to place the signal generator 142 in operation. Incident to each resetting operation, an output signal is applied to the related one of the output switches or terminals 133, 135, or 137 to be directed to the selected one of the data receiving means 132, 134, 136, and 138.

The register stages 112, 114, and 116 are similar to the register stages 12, 14, 16, 18, and 20. The register stage 12 includes a latching relay or switching assembly operated by a differential winding 150 and a control relay operated by a differential winding 160. The winding 150 includes a pair of oppositely wound or poled coils **150*a* and 150*b* for selectively applying oppositely poled fluxes to the magnetic elements of a sealed switch providing a pair of normally open contacts 152. The differential winding 160 includes a pair of coils 160*a* and 160*b* for applying oppositely poled flux fields to a pair of sealed switches providing a pair of normally open contacts 162 and a pair of normally closed contacts 164. The two coils 150*a* and 150*b* of the differential winding 150 are coupled by a diode 156, and the coils 160*a* and 160*b* of the differential winding 160 are coupled by a diode 169. A diode 167 provides an additional unidirectional input for the coil 160*a* in the differential winding 160. The register stages 114 and 116** have a similar construction.

When a data item is to be stored in one of the register stages. such as the stage 112, the switch 122 is closed to forward a positive potential through a diode 151 to energize the coil **150*a* and through the diodes 151 and 167 to energize the coil 160*a*. The closure of the switch 122 also farwards a positive potential through a diode 161 to energize the coils 160*a* and 160*b* in the differential winding 160. Since both of the coils of the winding 160 are energized, opposed fluxes are applied to the magnetic elements forming the contacts 162 and 164, and these contacts are not operated. However, since only the winding 150*a* in the differential winding 150 is energized, a unidirectional flux field is applied to the magnetic elements forming the contacts 152, and these contacts are closed to complete a latching or holding circuit for maintaining the energization of the coils 150*a* and 160*a*. Accordingly, when the switch 122 is opened, the energization of the coil 160*b* is terminated and only the coils 150*a* and 160*a* remain energized. In view of the energization of only the single coil 160*a* in the differential winding 160, a unidirectional flux field is applied to the magnetic elements forming the contacts 162 and 164, and these contacts are actuated. The closure of the contacts 162 connects the signal conductor 144 through a diode 163 to the switch 133 and thence either in series to the common data receiving means 138 or to the individual data receiving means 132. The opening of the contacts 164 interrupts the extension of the signal conductor 144 in the remaining register stages. The register stage 112** is now in a set condition.

When the contacts 152 are closed incident to placing the register stage 112 in a set condition, the positive potential provided by the close contacts 152 is forwarded through a diode 155 to be applied to the status conductor 146. The application of the positve potential to the conductor 146 energizes a winding 148 to close a pair of normally open contacts 149. The closure of the contacts 149 connects the positive potential source to the pulse generator 142 and places this generator in an operative state. The pulse generator 142 comprises a pair of transistors 180 and 182 which are normally in a nonconductive condition. The collector of the transistor 182 is connected to the potential source through an operating winding 170 of a suitable switching means, such as a single-side-stable mercury switch, having a pair of normally open contacts 172 and a pair of normally closed contacts 174.

When the positive potential is supplied by the contacts 149, a pair of resistance elements 184 and 186 forming a voltage dividing network applies a positive bias to the emitter of the transistor 182. The base of this transistor is connected by a diode 188 to a timing circuit including a resistance element 190, a diode 192, and a capacitor 194 connected in series between ground and the positive potential source. The capacitor 194 is charged over this circuit until the base of the transistor 182 is driven positive with respect to its emitter. At this time, the transistor 182 is placed in a conductive condition to energize the winding 170 so that the contacts 172 are closed and the contacts 174 are opened.

The closure of the contacts 172 connects the positive potential source through the closed contacts 162 in the set register stage 112 and the diode 163 to apply an output signal to the switch 133. This positive potential also energizes the coil **150*b* and is forwarded through the diode 156 to maintain the energization of the coil 150*a*. This potential is also forwarded through the diodes 156 and 167 to maintain the energization of the coil 160*a*. Since both of the coils 150*a* and 150*b* are energized, the contacts 152 are opened to interrupt the above-described latching or holding circuit. The coils 150*a*, 150*b*, and 160*a* remain energized by the positive potential on the conductor 144, and the winding 148 remains energized from the potential source over a circuit including the closed contacts 149, 172, and 162 and the diodes 156 and 155**.

The stage 112 remains in this partially reset condition until such time as the positive-going pulse applied to the conductor 144 is terminated. When the transistor 182 is first placed in conduction to initially energize the winding 170, the charge across the capacitor 194 begins to discharge over a circuit including the base-emitter circuit of the transistor 182 and the resistance element 186 in the voltage dividing network. When the contacts 174 are opened, the inhibiting bias applied to the base of the transistor 180 by an adjustable resistance element 196 from a voltage dividing network including a pair of series connected resistance elements 198 and 200 is removed, and the base of the transistor 180 becomes positive relative to its emitter electrode which is connected to one terminal of the charged capacitor 194. By adjusting the resistance element 196, the base current through the transistor 180 and its effective impedance shunting the capacitor 194 is controlled. The impedance of the transistor 180 shunting the base-emitter path of the conductive transistor 182 determines the time interval required to discharge the capacitor 194 to a point at which conduction through the transistor 182 is terminated. At this time, the transistor 182 is placed in a nonconductive state to terminate the energization of the winding 170 to cause the closure of the contacts 174 and the opening of the contacts 172. Thus, the setting of the variable resistance element 196 controls the "on" time of the reset signal.

The closure of the contacts 174 returns a positive potential to the pulse generator 142 if at least one of the remaining register stages 114 or 116 is in a set condition. This potential applied through the closed contacts 174 energizes the voltage dividing network including the resistance elements 198 and 200 to bias the base of the transistor 180 positive with respect to its emitter and thus terminates any conduction therethrough. This potential is also effective through the adjustable resistance element 190 and the diode 192 to reinitiate the charging of the capacitor 194. The value of the resistance element 190 determines the time required to charge the capacitor 194 to the potential at which the transistor 182 is again placed in a conductive condition, and thus determines the "off" time in the pulse cycle of the generator or source 142.

When the contacts 172 are opened, the positive potential supplied through the contacts 162 and the diode 163 to the switch 133 is terminated, and the output pulse or signal controlled by the register stage 112 is terminated. Since this output pulse is supplied directly from the signal generator 142, the duration and electrical characteristics thereof are uniform and are supplied in a predetermined timed relationship. If desired, the contacts 172 or the signal source 142 can be connected to means for synchronizing or clocking the output pulses provided under the control of the various register stages 112, 114, and 116. The opening of the contacts 172 also terminates the energization of the coils **150*a*, 150*b*, and 160*a*. The termination of the energization of the coils 150*a* and 150*b* in the differential winding 150 restores the latching relay to its normal deenergized condition but does not affect the status of the contacts 152 which were opened by the prior concurrent energization of both of the coils 150*a* and 150*b*. However, the termination of the energization of the coil 160*a* terminates the application of a flux field to the magnetic elements forming the contacts 162 and 164 so that the contacts 162 are opened and the contacts 164 are closed. The opening of the contacts 162 disconnects the register stage 112 from the signal conductor 144, and the closure of the contacts 164 extends the conductor 144** to the next register stage in a set condition.

The opening of the contacts 172 also terminates the operation of the signal source 142 if no other register stage is in a set condition. More specifically, the opening of the contacts 172 interrupts the energizing circuit for the winding 148 so that the contacts 149 are opened. This removes the positive potential from the pulse source 142.

The self-scanning register circuit 100 also includes means for preventing the receipt of an input signal during a resetting operation from affecting the resetting operation and the concurrent provision of the output signal of the desired characteristics. If an input signal is received by a register stage that is disposed to the right (FIG. 2) of the stage being reset, the receipt of the input signal does not affect either the generation of the output signal or the resetting of the register stage. If, however, an input signal is received by a register stage disposed to the left in the resetting sequence of the register stage being reset, the operation of this register stage to its set condition would immediately terminate the resetting operation. As an example, if the register stage 114 is being reset and an input signal is supplied to the register stage 112 by the closure of the contacts 122, the operation of the stage 112 to its full set condition causes the opening of the contacts 164 in the manner described above and terminates the application of the resetting signal from the pulse source 142 to the register stage 114.

To prevent this, a diode 165 is connected between the signal conductor 144 and the differential winding 160. Accordingly, whenever a scanning or resetting operation is taking place at any register stage in the resetting sequence, both of the coils **160*a* and 160*b* in the differential windings 160 in all of the register stages disposed to the left of the stage being reset will be energized by the signal on the conductor 144 through the related diode 165. Since both of the coils 160*a* and 160*b* are energized, the status of the contacts 162 and 164 in all of these register stages cannot be altered even though the holding circuit controlled by the contacts 152 has been completed and the input signal has disappeared. When the scan or reset signal is removed from the conductor 144, all of the partially set register stages are then operated to a full set condition in the manner described above. The diodes 161 in each of these register stages prevents the setting of each of these register stages by scan signals supplied through the diode 165**.

The self-scanning register circuit 100 is also designed so that mercury-wetted contact relays can be used in place of the magnetic reed switches used in the circuit shown in FIG. 2. As set forth above, each of the register stages 112, 114, and 116 requires only a single sealed magnetic reed switch controlled by the differential winding 150 to provide the normally open contacts 152 and a pair of sealed megnetic reed switches controlled by the differential winding 160 to provide the normally open contacts 162 and the normally closed contacts 164, the normally closed state of the contacts 164 usually being provided by a bias magnet normally holding the magnetic elements of this reed switch in contact. Further, the two reed switches providing the contacts 162 and 164 have a common point of connection. This point of common connection can be connected to the armature of the mercury switch which comprises an armature alternately movable into engagement with two spaced magnetic contact elements or terminals. By using a single-side-stable mercury relay in which the armature is magnetically biased into engagement with one contact or terminal, the normally closed contacts 164 are provided by the armature and the contact into which the armature is normally biased into engagement, and the normally open contacts 162 can be provided by the armature and the contact or terminal normally spaced from the armature. The normally open contacts 152 can be provided by another sealed mercury switch in which the contact afforded by the terminal normally engaged by the armature is not used, and the armature and the contact or terminal normally spaced from the armature provide the normally open contacts 152.

When the mercury switches rather than sealed magnetic reed switches are used in the counting circuit 100, each of the register stages 112, 114, and 116 is provided by a control module 210 shown in FIG. 3 of the drawings. The control module 210 includes a differential winding 212 including a pair of oppositely wound or poled coils **212*a* and 212*b* coupled by a diode 214. The differential winding 212 controls the operation of the mercury switch providing the normally open contacts 152. The register stage 210 controls a second differential winding 216 including a pair of oppositely poled or wound coils 216*a* and 216*b* for controlling the contacts 162 and 164. The register stage or module 210 can be directly inserted into the circuit 100 for the register stages 112, 114, and 116** shown in FIG. 2 by directly connecting like positioned terminals.

Accordingly, when an input data item is to be stored in one of the modules 210, the closure of, for instance, the switch 122 forwards a positive potential through the two diodes 151 and 161 to energize the coils **212*a*, 216*a*, and 216*b* in the manner described above. Since both of the coils 216*a* and 216*b* in the differential winding 216 are energized, the contacts 162 and 164 provided by the single-side-stable mercury switch controlled by this differential winding are not actuated. The coil 212*a* provides a flux field opposing the bias provided by the magnet in the mercury switch controlled by the differential winding 212 and operates the armature to engage the alternate terminal or contact to close the normally open contacts 152**. This completes the holding circuit in the manner described above.

When an input signal is terminated by opening the switch 122, the holding circuit provided by the closed contacts 152 maintains the energization of the coils **212*a* and 216*a*. The coil 212*a* maintains the contacts 152 in a closed condition. However, in the mercury switch controlled by the differential winding 216, only the coil 216*a* is energized, and this coil provides a flux field opposing the field provided by the bias magnet. Thus, the armature transfers from a position engaging the normally engaged contact to a position engaging the alternate terminal so that the contacts 162 are closed and the contacts 164 are opened. The remaining operations produced by the circuit 100 incident to the setting of the stage provided by the module 210** are the same as those described above in conjunction with the description of the register stage 112.

When the module 210 is to be reset, the positive-going signal provided by the closed contacts 172 directly energizes the coil **212*b* and energizes the coils 212*a* and 216*a* through the diode 214. The concurrent energization of the coils 212*a* and 216*a* in the differential winding does not result in the application of an effective flux field to the armature of the related mercury switch. Thus, the armature in this switch is transferred to a position engaging the normally engaged contact by the magnetic bias so that the contacts 152 are opened. At the end of the resetting or scanning pulse, the coil 216*a* is no longer energized, and the armature in the magnetic sealed mercury switch controlled by the differential winding 216 is restored by the bias magnet to its normal position in which the contacts 164 are closed and the contacts 162 are opened. Thus, the register circuit 100 operates to provide output signals corresponding to input signals in the same manner described above using the register stages 210 in place of the register stages 112, 114, and 116**.

The register stage 210 also provides means for preventing improper operation of the circuit 100 when an input signal is received during the development of an output signal and the resetting of a selected one of the register stages 210 disposed to the left of the register stage 210 being reset by any given pulse. More specifically, the reset pulse energizes the coil **216*b* in any register stage 210 disposed to the left of the register stage being reset in the scanning sequence. The coil 216*b* provides a flux field aiding the bias field of the bias magnet in the sealed mercury switch and holds the contacts 162 and 164 in their normal position. The module 210** is operated to its full set position at the termination of the scanning or resetting signal in the manner described above.

Although the present invention has been described with reference to a number of illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. A self-scanning register circuit comprising a plurality of register stages alternately operable to first and second states, input means for selectively operating different ones of the register stages to their first states in accordance with input data, said register stages being operable to their first states in a random order, a signal source common to the register stages for operating the register stages to their second states, circuit means providing a series circuit for coupling the plurality of register stages to the signal source, each of said register stages including reset means operative when the given stage is in its first state for connecting the given stage to the signal source and for interrupting the series circuit extending to any register stage subsequent to the given stage, each reset means being placed in a condition restoring the series circuit when the related register stage is placed in its second state by the signal source so that any register stages placed in their first state by the input means in a random order are placed in their second state in a sequence determined by their positions in the series circuit and the time of operation to their first state, and output means controlled by the register stages and supplying an output signal for each register stage placed in a second state.

2. The register circuit set forth in claim 1 including means controlled by placing a register stage in its first state for placing the signal source in operation.

3. A self-scanning register circuit comprising a plurality of register stages each operable to alternate first and second conditions, input means for operating the register stages to their first states in accordance with data inputs occurring at random intervals, a signal source providing a periodic signal of a given duration, circuit means controlled by the register stages in their first state for rendering the signal source effective to control the operation of these stages to their second states in sequence, each of said register stages including means in said circuit means responsive to a signal from the signal source for placing the stage in the second state at the end of the signal of said given duration, and output means controlled by the register stages for supplying an output signal of a duration proportional to said given duration in response to the operation of each register stage to its second condition.

4. A self-scanning register circuit comprising a plurality of register stages each operable to alternate first and second conditions, input means for operating the register stages to their first states in accordance with data inputs occurring at random intervals, a signal source for operating the register stages to their second condition, circuit means controlled by the register stages in their first condition for rendering the signal source effective to operate the register stages in the first condition to their second condition, output means controlled by the register stages for supplying output signals in response to the operation of the register stages to their second condition, and control means including the signal source for preventing the operation of a register stage to its first condition by a data input during the interval in which another stage is being operated to its second condition.

5. The register circuit set forth in claim 4 in which the control means includes means for storing a data input received by one stage during the interval in which another stage is being operated in its second condition.

6. A self-scanning register circuit comprising a plurality of register stages each including a control relay and a differential latching relay, input means for each of the register stages for operating the latching relay in response to a data input, each register stage including means controlled by the operation of the latching relay for operating the control relay in the same stage to store the data input, a signal source providing reset signals for resetting the register stages, means including the control relays for connecting the signal source to each register stage storing a data input in sequence, each register stage including circuit means for connecting the signal source to the differential latching relay to cause its release and to the control relay to maintain its operation following the release of the latching relay until the end of the reset signal and then to cause its release, and output means controlled by the operated control relays for supplying output signals.

7. The register circuit set forth in claim 6 in which the signal source resets the register stages in a given sequence, and in which each register stage includes circuit means for rendering the signal source effective to prevent the operation of a control relay in a register stage interposed in the sequence between the signal source and the register stage being reset.

8. A self-scanning register circuit comprising a plurality of register stages each operable to set and reset conditions, input means for selectively operating the register stages to their set conditions in random combinations in accordance with input data, a reset signal conductor common to the register stages and connecting the register stages in a given sequence, a signal source for supplying reset signals to the signal conductor, and circuit means in each register stage operable when the register stage is in its set condition for connecting the register stage to the signal conductor and for interrupting the extension of the signal conductor to register stages disposed further away from the set register stage in the given sequence, said circuit means including means responsive to a signal on the signal conductor for operating the set register stage to its reset condition in which the signal conductor is disconnected from the reset register stage and extended to the subsequent register stages in the given sequence.

9. The register circuit set forth in claim 8 in which each register stage includes additional circuit means operative when the input means attempts to operate a given register stage disposed in the given sequence prior to a set register stage that is being reset by the signal source for operating the given register stage to a preliminary set condition in which the connection of the signal conductor to the stage being reset is not interrupted until the stage being reset has been operated to its reset condition.

10. The register circuit set forth in claim 8 including output means individual to each register stage and connected to the signal conductor when the related register stage is in its set state.

11. The register circuit set forth in claim 8 in which each of the register stages includes means operative when the register stage is in its set condition for placing the signal source in operation.

12. A data collecting system comprising a plurality of data input means operable at random intervals, a plurality of register stages each operable from a reset condition to an alternate set condition by one of the data input means, data receiving means connected to the register stages for receiving data from the register stages in a timed sequence, a signal source for operating the register stages to their reset condition, said signal source normally being in an inoperative state, control means controlled by the register stages and operative to place the signal source in operation in response to placing a register stage in a set condition and to maintain the signal source in operation for so long as at least one of the register stages remains in a set condition so that the register stages are operated to their reset condition in sequence by the signal source, and means for delivering a data representing signal to the data receiving means incident to each operation of a set register stage to its reset condition.

13. A self-scanning register circuit comprising a plurality of register stages each operable to alternate set and reset conditions, a plurality of input means each controllable to operate a different one of the register stages to a set condition, signal responsive reset means for each register stage for operating the stage to a reset condition, an output means, a signal source supplying time spaced signals, and circuit means controlled by placing a given stage in a set condition for coupling a signal from the signal source to the reset means individual to said given stage to reset said given stage and for delivering a signal to the output means as said given stage is operated from its set condition to its reset condition.

References Cited

UNITED STATES PATENTS

| | | | |
|---|---|---|---|
| 1,917,679 | 7/1933 | Wiberg. | |
| 2,914,749 | 11/1959 | Vande Sande et al. -- | 340—168 |
| 3,215,994 | 11/1965 | Dowling. | |

JOHN W. CALDWELL, *Primary Examiner.*

D. J. YUSKO, *Assistant Examiner.*

U.S. Cl. X.R.

317—137